United States Patent [19]

Leahy

[11] Patent Number: 4,772,355

[45] Date of Patent: Sep. 20, 1988

[54] MULTIPURPOSE DISPENSER

[75] Inventor: David J. Leahy, Framingham, Mass.

[73] Assignee: Dennison Manufacturing Company, Framingham, Mass.

[21] Appl. No.: 87,364

[22] Filed: Aug. 20, 1987

[51] Int. Cl.[4] ........................ B32B 35/00; B65H 35/06

[52] U.S. Cl. ........................................ 156/584; 221/73; 225/33; 225/39

[58] Field of Search ........................ 156/527, 577, 584; 225/33, 39; 221/70, 73

[56] References Cited

U.S. PATENT DOCUMENTS

| | | | |
|---|---|---|---|
| 2,295,679 | 9/1942 | Montbach | 225/33 |
| 2,373,092 | 4/1945 | Avery | 156/584 |
| 2,838,171 | 6/1958 | Kaspar | 221/70 |
| 3,107,193 | 10/1963 | De Neul | 156/584 |
| 3,127,078 | 3/1964 | Dubnick | 225/33 |
| 3,793,123 | 2/1974 | Aronson | 156/584 |
| 4,104,110 | 8/1978 | Macosko | 156/577 |

*Primary Examiner*—Michael Wityshyn

*Attorney, Agent, or Firm*—Barry D. Josephs

[57] ABSTRACT

A dispenser for correction tape, reinforcement tabs and the like which is singularly capable of housing and dispensing one at a time of a permanent correction tape or permanent reinforcement tabs each of which includes a releasable backing sheet. The dispenser is also capable of housing and dispensing a readhering correction tape which does not require a separate backing sheet. The dispenser is of integral plastic construction molded as a single unit preferably by injection molding. The dispenser is adapted for easy loading and dispensing of the permanent correction tape, the permanent reinforcement tabs, or the readhering type correction tape. The dispenser is composed of a case which has a backface, two opposite facing side walls, a bottom panel, and an open front area. A cylindrical spindle is connected to the backface and protrudes into the case. The spindle holds the tape. The dispenser is provided with a first and a second cutting member and two threading members disposed therebetween. The threading members are secured to the back face and each threading member has a horizontal guide panel which is perpendicular to the back face. A continuous supply of either type of tape or reinforcement tabs is dispensed by manually pulling on the exposed end of the tape.

10 Claims, 2 Drawing Sheets

MULTIPURPOSE DISPENSER

BACKGROUND OF THE INVENTION

1. Field of the Invention

The present invention relates to dispensers for housing and dispensing correction tape.

2. Description of the Prior Art

Dispensers for correction tape typically are made of cardboard material, but plastic dispensers are also available. The nature of prior art correction tape dispensers depends on the width of the correction tape and whether a permanent correction tape or a readhering (repositionable) correction tape is to be housed in the dispenser. Prior art correction tape dispensers are designed to dispense either the permanent correction tape which contains a release backing or the readhering correction tape which contains no backing sheet. There is a need for correction tape dispensers of singular design which may be used for either the permanent correction tape or the readhering type correction tape.

Correction tape dispensers commonly available typically contain seperate components, for example the cutting edge or internal threading mechanism are typically separately secured to the dispenser casing. Cardboard correction tape dispensers, which are often used for dispensing permanent correction tape, have metallic cutters which are seperately secured to the top flap of the cardboard casing. This requires an extra step in the manufacuring process. The cardboard dispenser has the additonal disadvantage that the casing tends to become worn and oftentimes torn during use. This interferes with the smooth dispensing of correction tape. The prior art plastic tape dispensers have the disadvantage that they are suitable for dispensing only one type of correction tape that is the readhering type and they have the disadvantage of being suitable for only a narrow range in correction tape widths. Also as aforementioned the plastic dispensers often contain one or more components which must be separately secured to the casing, particularly if the dispenser is designed for housing and dispensing the permanent type correction tape which contains a releasable backing sheet.

It is the principal object of the present invention that the same dispenser be suitable for dispensing either a permanent correction tape or a readhering correction tape.

It is an important objective of the invention that the correction tape be easily dispensed from the case by simple manual pulling on the exposed end of the tape regardless of whether a permanent or readhering correction tape is used.

It is an objective that a continuous supply of tape be dispensed without friction occurring between the tape and the components of the dispenser sufficient to cause interruption of the continuous and smooth dispensing of the tape.

It is an objective that the same dispenser also is able to dispense permanent reinforcement tabs.

It is an important objective of the invention that the dispenser case be integrally molded by injection molding and the components in contact with the tape be able to withstand the pressures exerted by the tape which comes in contact herewith as the tape is manually dispensed from the case.

SUMMARY OF THE INVENTION

The tape dispenser of the invention is designed to be integrally molded, for example, by injection molding. Thus, the tape dispenser and all components therein will be integrally molded resulting in a one piece construction. The tape dispenser will be molded of a thermoplastic material preferrably a translucent thermoplastic such as polystyrene. The tape dispenser of the invention has the advantage that a single embodiment may be used to dispense either a permanent correction tape, permanent reinforcement tabs or a readhering correction tape. The tape dispenser is adapted for easy loading and threading of either the permanent correction tape or the readhering type correction tape. Permanent correction tapes all employed a white correction substrate which is coated with a permanent adhesive. This type of correction tape normally comes with a release sheet which covers the adhesive coating so that the tape can be rolled on a spool without sticking to itself. The present invention is idealy suited for dispensing permanent correction tape and causes automatic removal of the release sheet from the adhesive coated correction substrate as one end of the correction tape is manually pulled through the dispenser. On pulling, the release sheet automatically separates from the correction tape. The user simply then cuts the desired portion of the correction substrate using a cutter edge fitted into the present tape dispenser. The peeled release sheet is similarily cut with another fitted cutting edge and the cut release sheet is then discarded. In place of the continuous permanent correction tape the release sheet may have attached thereto reinforcement tabs commonly used to reinforce punched holes in notebook paper. The circular reinforcement tabs may be arranged serially in spaced-apart arrangement on the release sheet. As the release sheet is pulled, the reinforcement tabs automatically separate from the release sheet.

The present invention has the advantage that it also can be used for a dispensing a second type of correction tape, mainly a readhering correction tape. The permanent correction tape or a readhering correction tape can easily be loaded into the dispenser case one at a time. In either case the correction tape is easily threaded and is easily dispensed by simply manually pulling on one end of the tape. The present invention permits easy manual dispensing of the tape or reinforcement tabs without causing friction between the dispenser and the tape sufficient to interfere with the smooth continuous dispensing of the product. The dispenser of the present invention can be fitted with either the permanent correction tape or the readhering type correction tape or tape containing reinforcement tabs and the like during the manufacturing process, or the user can load an empty dispenser with either one of these tapes.

The present dispenser is composed of a case which has a backface panel, two oppositely facing sidewalls, a bottom panel, and an open front area. A cylindrical spindle is connected to the backface of the dispenser and protrudes into the case. The spindle is designed for holding a roll of tape in place. The dispenser is provided with a first and second cutting member and two threading members disposed between the first and second cutting members. These members are secured to the case at the top end thereof. The first cutting member is formed preferably of a downwardly sloping flat panel, and the second cutting member is formed preferably of a curved panel. Each of the cutting members is provided with an exposed cutting edge.

The first and second threading members are connected to the backface panel and are spaced apart from one another. The first threading member is located in closer proximity to the first cutting member and the second thread member is located in closer proximity to the second cutting member. The first threading member is composed of at least a horizontal guide panel which is oriented perpendicularly to the backface. The first threading member preferably also has a vertical guide panel which is attached to the horizontal guide panel and extends vertically downward from the horizontal guide panel. The vertical guide panel is perpendicular to the horizontal guide panel. The vertical guide panel is advantageously a flat panel but it may be of another shape, for example, it may be of cylindrical or semicylindrical shape. The second threading member is composed of at least a horizontal guide panel which is perpendicular to the backface. A vertical guide panel may be attached perpendicularly to the horizontal guide panel of the second threading member but the vertical guide panel may be omitted from the second threading member. The vertical guide panel may be flat, curved, cylindrical or semicylindrical shape.

When a permanent correction tape is used in the dispenser of the present invention, the tape is simply fitted onto the spindle so that the tape can unravel in a counter clockwise direction. The small starter portion of the release backing sheet is first manually peeled from the correction tape to expose a portion of the correction substrate. The peeled release sheet is simply threaded over the horizontal guide of the first threading member and then under the vertical guide panel of the second threading member and thence over the second cutting member until the exposed end of the release sheet overlaps the second cutting member. The exposed adhesive coated correction substrate is threaded over the first cutting edge. The user simply pulls the release backing sheet in a horizontal direction to dispense correction tape from the dispenser. The release backing sheet peels from the correction tape and a continuous supply of correction substrate is dispensed from the case.

When it is desired to dispense a readhering correction tape the user simply loads the spindle with a spool of the readhering correction tape so that the tape can be unraveled in a clockwise direction. The exposed end of the readhering correction tape is simply threaded between the second threading member and the second cutting member until the exposed end overlaps the second cutting edge. In this embodiment the readhering correction tape is easily dispensed from the case by simple manual pulling of the exposed end of the correction tape. When the desired portion is dispensed the user need only cut the exposed portion of the tape by tearing it along the second cutting member. When the supply of readhering correction tape is exhausted, the user has an option of replenishing the dispenser with either a new roll of permanent or readhering correction tape.

When it is desired to dispense permanent reinforcement tabs, the user loads the tape containing the reinforcement tabs into the dispenser in the same manner as in loading the permanent correction tape. As the release sheet is pulled, the reinforcement tabs automatically separate from the release sheet. When the supply of reinforcement tabs is exhausted the user may replenish the dispenser with a new roll of tape containing reinforcement tabs.

DETAILED DESCRIPTION

Figure 1:
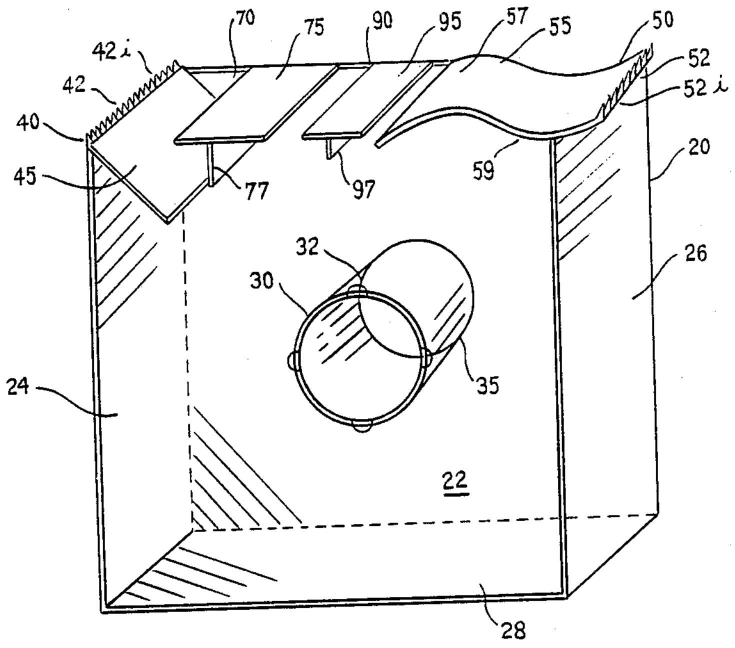
FIG. 1 is a perspective view of the correction tape dispenser of the invention.
Figure 2:
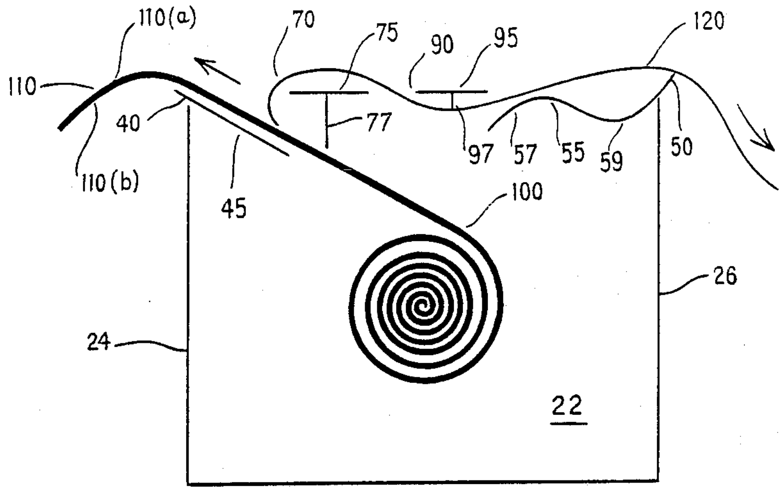
FIG. 2 is a front elevation view of the dispenser shown in FIG. 1 but loaded with a permanent correction tape.
Figure 3:
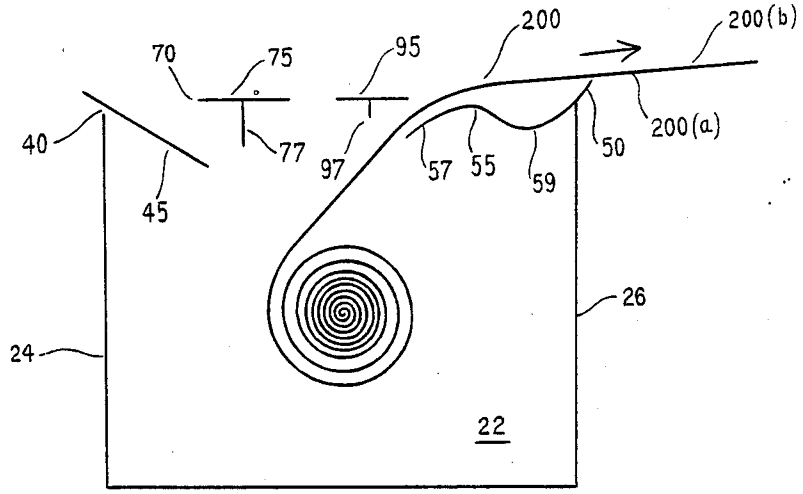
FIG. 3 is a front elevation view of the dispenser as shown in FIG. 1 but loaded with a readhering correction tape.

A preferred embodiment of the correction tape dispenser of the invention is shown in FIG. 1–3. With reference to the Figures the correction tape dispenser 10 is composed of a case 20 with an integrally molded fixed spindle 35 for holding the correction tape in case 20. Case 20 is composed of sidewall 24 and 26, backface panel 22 and bottom panel 28. Spindle 35 is connected to backface 22 and protrudes from backface 22 into the interior of tape 20. Case 20 includes first and second cutting members 40 and 50, respectively and first and second threading members 70 and 90, respectively.

First cutting member 40 is composed of a downwardly sloping approach panel 45 which is preferably flat but may be of curved shape for example concave shape. Cutting member 40 contains a series of cutting teeth 42 along its exposed edge to form a cutting edge **42*i*. Second cutting member 50 is located directly opposite first cutting member 40. Cutting member 40 is connected to backface panel 22 and sidewall 24 and cutting member 50 is connected to backface panel 22 and sidewall 26**.

Cutting member 50 is formed of a single surface preferrably one that is curved as depicted in FIG. 1. Cutting member 50 is preferrably curved to form a downwardly sloping surface 57 which, in effect, functions as an approach panel for guiding the correction tape from spindle 35 to cutting edge 52. Cutting member 50 terminates with cutting edge 52 which extends beyond sidewall 26. Cutting edge 52 is composed of a series of teeth **52*i* which protrude from edge 52. Cutting member 50 is a single panel curved to form a single continuous curved surface having a convex portion 55 followed by a concave (trough) portion 59 as best illustrated in FIG. 1. Thus, the concave (trough) portion 59 is located intermediate convex portion 55 and cutting edge 52. An alternate embodiment of right cutting member 50 could be a single, flat, downwardly sloping panel as depicted in downwardly sloping approach panel 45. However the curved shape for cutting member 50, as shown in FIG. 1**, has been determined to be preferable.

Threading members 70 and 90 are spaced apart and located between left cutting member 40 and right cutting member 50 as illustrated in FIG. 1. Threading member 70 is located near cutting member 40 and threading member 90 is located between threading member 70 and right cutting member 50 as illustrated in the Figures. Threading members 70 and 90 are each connected to backface panel 22 and protrudes from backface 22 into the interior of case 20. Threading member 70 contains a horizontal guide panel 75 which is aligned essentially perpendicular to backface 22. The horizontal guide panel 75 is preferably a flat planar surface but may also be a slightly curved surface having a concave shape. Vertical guide panel 77 is arranged perpendicular to horizontal guide panel 75 and is connected to the horizontal guide panel 75 as shown in FIG. 1. Vertical guide panel 77, therefore, is oriented parallel to sidewalls 24 and 26 of the dispenser case 20.

Vertical guide panel 77 is preferably a flat panel but may be of another shape, for example it may be of cylindrical or semi-cylindrical shape.

Threading member 90 has a construction similar to that of threading member 70. Thus, threading member 90 is preferably formed of a horizontal guide panel 95 which is connected to backface 22 and is oriented perpendicularly to backface 22. Horizontal guide panel 95 is preferably a flat surface but may also be slightly curved to form a slightly concave surface. Threading member 90 also preferably includes a vertical guide panel 97 which is connected to horizontal guide panel 95 and is perpendicular to the surface of horizontal guide panel 95. Thus, vertical guide panel 97 is parallel to sidewalls 24 and 26 of the dispenser case 20. Vertical guide panel 97 is optional and may be omitted. Its inclusion, however, is preferred. Each of the vertical guide panels 77 and 97 are preferably flat panels as shown in FIG. 1, however, they may be of curved, cylindrical or semicylindrical shape. These vertical guide panels 77 and 97 are also connected to the backface 22 and are oriented perpendicularly to backface 22. The cutting member 40 and cutting member 50 are each as wide approximately as the sidewalls 24 and 26. Similarily, horizontal guide panels 75 and 95 as well as vertical guide panel 77 and 97 are each as wide approximately as sidewalls 24 and 26. Vertical guide panel 97 of threading member 90 is shorter than vertical guide panel 77 of threading member 70. Also, preferably horizontal guide panel 95 of threading member 90 is narrower than horizontal guide panel 75 of threading member 70. The threading members 70 and 90 are spaced apart from each other. Threading member 70 is spaced apart somewhat from first cutting member 40 but it is closer to cutting member 40 than to cutting member 50. Likewise, threading member 90 is spaced apart slightly from cutting member 50 but it is closer to cutting member 50 than cutting member 40.

Cylindrical spindle 35 is connected to the backface panel 22 at about the center and protrudes into the interior of dispenser case 20. Spindle 35 has a length approximately equal to the width of sidewall 24 and 26. Spindle 35 includes a plurality of retaining sprockets 32 to keep the roll of correction tape in place on spindle 35. Sprockets 32 may be rigid but preferably are resilient and flexible enough to bend inwardly towards the direction of the backface 22 as finger pressure is applied to them. This allows for easier insertion of a new roll of correction tape onto spindle 35. After the roll of correction tape is inserted onto a spindle 35, the roll is preferably covered with a flat cardboard panel (not shown) which is placed over sprockets 32 onto spindle 35.

Correction tape dispenser 10 is preferably integrally molded by injection molding. Thus, the correction tape dispenser 10 is of one piece construction formed during the injection molding process. This eliminates the need to use adhesive to secure any component of the dispenser. All the components of dispenser 10 therefore are formed during the injection molding process and a final one piece construction with all the components shown, e.g., in FIG. 1 is the resulting product. Although a variety of thermoplastics can be used for dispenser 10 and the components therein, it has been found advantageous to use polystyrene. Polystyrene forms a transparent dispenser case and is of sufficient durability for use in fabricating the dispenser 10 in one integrally molded step by injection molding.

The correction tape dispenser of the invention has the advantage that it may be used with two distinctly different types of correction tape. One popular correction tape which can be used in the present dispenser is the permanent type correction tape. This type of correction tape is coated with a permanent adhesive so that when the tape is applied to cover typewritten material or other printed text, the tape cannot be removed from the covered material. This type of correction tape is referenced as correction tape 110 in FIG. 2. Correction tape 110 is composed of a white correction surface 110 (*b*) which is coated with a permanent adhesive 110 (*a*) on the side opposite the white correction surface 110 (*b*). The adhesive surface 110(*a*) is protected by a release backing sheet 120 which is typically a wax or silicone coated backing sheet. The backing sheet 120 is necessary to protect the adhesive layer 110(*a*) and to keep the correction tape 110 from sticking to itself as the tape is wound into a roll. This type of correction tape is in common use and is readily available from any stationery store.

The second type of correction tape which can be used in the dispenser of the invention is illustrated in FIG. 3. This type of correction tape is a readhering and repositionable correction tape. The readhering correction tape is referenced as tape 200 shown in FIG. 3. Readhering correction tape 200 is composed of a white correction surface 200(*b*) which is coated with a readhering adhesive 200(*a*) on the side opposite the white correction surface 200(*b*). Since the adhesive layer 200(*a*) is not a permanent adhesive but rather is a readhering adhesive, there is no need for a separate release backing sheet such as backing sheet 120 shown with the permanent type correction tape 110. Thus, readhering correction tape 200 can be wound into a roll directly without need for a release backing sheet. This type of correction tape is also in common use and is readily available from any stationery store. It provides the user with the option of being able to remove the tape from the covered typewritten or printed material.

The embodiment, illustrated in FIG. 2, shows the threading of the present dispenser when permanent correction tape is to be dispensed therefrom. When permanent correction tape is to be employed in tape dispenser 10, permanent correction tape 100 is inserted onto spindle 35 and then threaded over the first cutting member 40 and around threading members 70 and 90 as shown in FIG. 2. In order to thread the permanent correction tape 100 the user simply needs only peel a portion of the release backing sheet 120 from the correction tape 110 at the exposed end of the tape. The peeled correction tape 110 is then passed over cutting panel 45 so that it rests over cutting edge 42. The peeled release backing sheet 120 is then threaded over horizontal guide panel 75 of threading member 70 and then under vertical guide papel 97 of threading member 98. It is then passed over cutting approach panel 57 of cutting member 50 until the end of the backing sheet lies over right cutting edge 52. When the permanent correction tape 100 is firmly in place on spindle 35 and when the exposed ends of the correction tape is threaded in the described manner, correction tape 100 is ready for dispensing. In order to dispense the tape 110 the user simply pulls the release backing sheet 120 in a horizontal direction and the correction tape 110 automatically separates from the release backing 120. The peeled correction tape 110 automatically dispenses over the cutting member 40. When enough tape is dispensed the user simply cuts the dispensed correction tape 110 by tearing it over cutting edge 42. The residual release backing sheet 120 is torn along the right cutting edge 52 and then discarded. After the dispensed correction tape 110 is cut from dispenser 10 it may be applied directly to any surface by applying the exposed adhesive surface 110 (a) to the surface and text to be covered. Once applied, correction tape 110 will permanently adhere to the covered surface permitting the user to type or write over the exposed white correction surface 110(*b*). The arrangement and shape of cutting members 40 and 50 and threading members 70 and 90 allow easy manual dispensing of the permanent correction tape 110 with exertion of only slight manual pulling of release backing sheet 120. The arrangement and shape of the component of the present dispenser reduces the friction of the release backing sheet 120 and correction tape 110 during dispensing of the tape. At the same time the present design permits a reliable continuous uninterrupted dispensing of tape as the release backing sheet 120 is pulled from the dispenser.

In place of the continuous permanent correction tape, substrate 110(*b*) may be in discrete shapes, such as discrete circular reinforcement tabs commonly used to reinforce punched holes in notebook paper. The circular reinforcement tabs may be arranged serially in spaced apart arrangement on release sheet 120. As release sheet 120 is pulled, the reinforcement tabs will then automatically separate from the release sheet 120 in the same manner that the continuous correction tape separates as shown in FIG. 2.

Instead of reinforcement tabs, substrate 110(*b*) may be in the shape of discrete stars or other shapes which are arranged serially in spaced apart arrangement on release sheet 120. The above described function and advantages of the present dispenser thus applies equally well when permanent adhesive coated reinforcement tabs, stars, rectangular or circular labels and the like, are arranged serially in spaced apart arrangement on release sheet 120. After the reinforcement tabs, stars or other shaped substrates become separated from release sheet 120, they may be applied directly to any desired surface since they are coated with a permanent adhesive.

The dispenser 10 of the invention can alternatively be used for dispensing the readhering type of correction tape. Use of the present dispenser 10 for dispensing readhering correction tape 200 is illustrated in FIG. 3. To use the readhering correction tape the user simply loads readhering correction tape 200 onto spindle 35 by inserting the rolled correction tape 200 over retaining sprocket 32 until the roll rests on spindle 35. Retaining sprocket 32 will keep the correction tape 200 in place on spindle 35. The free end of the readhering correction tape 200 is simply passed between horizontal guide panel 95 of threading member 90 and approach panel 57 of cutting member 50. The exposed end of the readhering correction tape 200 is pulled until it passes over cutting edge 52. When the user desires to dispense the readhering correction tape he need only pull on the exposed end of the readhering tape 200 and then cut the desired amount of tape by tearing the tape along cutting edge 52. The cut tape may then be directly placed over the text or printed material to be covered by applying the exposed adhesive surface 200 (*a*) of the correction tape directly onto the substrate to be covered. Since adhesive surface 200(*a*) is a readhering adhesive the user may remove and reposition the correction tape from the applied surface before or after the desired corrections are made.

Thus, the dispenser of the present invention has the advantage of dispensing either a permanent correction tape which employs a release backing sheet or alternatively with a readhering correction tape which does not employ a release backing. Either type of correction tape can be housed and dispensed in the dispenser 10 of the present invention. The dispenser 10 has the advantage that it can be easily molded of one piece construction by injection molding. The components are formed, shaped and positioned in the described manner that they will not break or become distorted during dispensing of the tape regardless of wether permanent correction tape or readhering correction tape is used. The present dispenser is purchased either with a permanent correction tape 100 or a readhering correction tape 200 already loaded and threaded in the dispenser in the manner illustrated in FIGS. 2 and 3 respectively. Alternatively the tape dispenser may be purchased separately and loaded manually with either the permanent correction tape 100 or the readhering correction tape 200. Thus, the present invention has the advantage to the manufacturer in that the same dispenser can be either preloaded with either type tape and has the advantage to the user that the user may reload the dispenser at any time with either the permanent tape or the readhering correction tape.

Although the present invention has been described with respect to a perferred embodiment, it should be appreciated that variation of design is possible without departing from the concept and scope of the invention. Therefore, the present invention is not intended to be limited to the perferred embodiment described herein but rather by the claims and equivilent thereof.

What is claimed is:

1. A dispenser for housing and dispensing a rolled substrate comprising:

a case formed of molded plastic comprising a back face panel, two oppositely facing sidewalls connected to said backface panel, a cylindrical spindle connected to the backface panel and protruding into the interior of the dispenser, said spindle adapted to removably hold the rolled substrate in the dispenser, a first cutting member and a second cutting member each connected to one of the oppositely facing side walls, and a first and a second threading member each connected to the backface panel and each disposed between said first and second cutting members, said first threading member located in closer proximity to the first cutting member than to said second cutting member and said second threading member located in closer proximity to the second cutting member than to said first cutting member, said cutting and threading members integrally molded with said case by injection molding, said threading members each comprising a horizontal guide panel, the horizontal guide panel oriented substantially perpendicularly to the backface panel, wherein the horizontal guide panel of one of said threading members is of narrower width than the width of the horizontal guide panel of the other threading members, said width of the guide panel of each threading member being the greatest distance between two of its edges measured in a direction along a line parallel to the backface panel, wherein at least one of said threading members has a vertical member protruding downwardly from said horizontal panel in a direction toward the interior of the dispenser, and wherein said dispenser at least functions to house and dispense one at a time of two types of correction tapes, the first type being a rolled permanent correction tape having a releasable backing sheet attached to an adhesive coated substrate, said backing sheet being stripped from the adhesive coated substrate as the correction tape is manually pulled through the dispenser and the second type of correction tape being a rolled readhering and repositionable correction tape not having a releasable backing sheet.

2. A dispenser as in claim 1 wherein the first threading member has vertical member oriented substantially perpendicularly to the horizontal guide panel of said first threading member.

3. A dispenser as in claim 1 wherein the first cutting member is formed of a downwardly sloping substantially flat panel.

4. A dispenser as in claim 3 wherein the second cutting member is formed of a substantially curved panel.

5. A dispenser as in claim 1 which functions to dispense said rolled permanent correction tape by inserting said correction tape onto said spindle and passing the adhesive coated substrate portion of the exposed end of said permament correction tape over the first cutting member and passing a portion of the releasable backing sheet of the exposed end of said permeanent correction tape over said first threading member, thence under said second threading member, whereupon the releasable backing sheet becomes automatically separated from the adhesive coated substrate by manually pulling on said threaded end of the release backing sheet and whereupon the adhesive coated substrate is thence cut by tearing said adhesive substrate over the first cutting member.

6. A dispenser as in claim 5 which also functions to dispense a readhering and repositionable rolled correction tape by inserting the correction tape onto said spindle and passing an exposed end of the correction tape over the second cutting member which is formed of a substantially curved panel, manually pulling on the exposed end of said correction tape and thence cutting said exposed portion of the tape by tearing it over said curved cutting member.

7. A dispenser as in claim 1 wherein said dispenser further functions to at least dispense adhesive coated reinforcement tabs arranged serially in spaced apart arrangement on a releasable backing sheet, the reinforcement tabs on said backing sheet forming a rolled tape held by said spindle, said backing sheet being stripped from the reinforcement tabs as the rolled tape is manually pulled through the dispenser.

8. A dispenser for housing and dispensing a rolled substrate comprising:

a case formed of molded plastic comprising a backface panel, two oppositely facing sidewalls connected to said backface panel, a cylindrical spindle connected to the backface panel and protruding into the interior of the dispenser said spindle adapted to removably hold the rolled substrate, a first cutting member and a second cutting member, each connected to one of the oppositely facing sidewalls, and a first threading member and a second threading member each connected to the backface panel and each disposed between said first and second cutting members, said first threading member located in closer proximity to said first cutting member than to said second cutting member, and the second threading member located in closer proximity to the second cutting member than to the first cutting member, said threading members being spaced apart from each other and from each of said cutting members, wherein said dispsenser at least functions to house and dispense one at a time of two types of correction tapes, the first type being a rolled permanent correction tape having a releasable backing sheet attached to an adhesive coated substrate sheet, said backing sheet being stripped from the adhesive coated substrate as the correction tape is manually pulled through the dispenser and the second type of correction tape being a rolled readhering and repositionable correction tape not having a release backing sheet, and wherein said threading members each comprises a horizontal guide panel, the horizontal guide panel oriented substantially perpendicular to the backface and at least one of the threading members has a vertical member protruding downwardly from said horizontal panel in a direction toward the interior of the dispenser.

9. A dispenser as in claim 8 wherein the horizontal guide panel on one of said threading members has a narrower width than the horizontal guide panel on the other threading member, said width of the guide panel of each threading member being the greatest distance between two of its edges measured in a direction along a line parallel to the backface panel.

10. A dispenser as in claim 8 wherein said dispenser further functions to at least dispense adhesive coated reinforcement tabs arranged serially in spaced apart arrangement on a releasable backing sheet, the reinforcement tabs on said backing sheet forming a rolled tape held by said spindle, said backing sheet being stripped from the reinforcement tabs as the rolled tape is manually pulled through the dispenser.

* * * * *